US008258685B2

(12) United States Patent
Kindler et al.

(10) Patent No.: US 8,258,685 B2
(45) Date of Patent: Sep. 4, 2012

(54) MULTI-PANEL DISPLAY SCREEN HAVING A SUPPORTING FILM LAYER

(75) Inventors: David Kindler, Concord, MA (US); Roger A. Hajjar, San Jose, CA (US); Akihiro Machida, Sunnyvale, CA (US)

(73) Assignee: Prysm, Inc., San Jose, CA (US)

( * ) Notice: Subject to any disclaimer, the term of this patent is extended or adjusted under 35 U.S.C. 154(b) by 328 days.

(21) Appl. No.: 12/493,128

(22) Filed: Jun. 26, 2009

(65) Prior Publication Data

US 2010/0327185 A1 Dec. 30, 2010

(51) Int. Cl.

| | |
|---|---|
| ***G09F 13/20*** | (2006.01) |
| ***G03B 21/56*** | (2006.01) |
| ***B31B 1/60*** | (2006.01) |

(52) U.S. Cl. ........................................ 313/110; 313/498

(58) Field of Classification Search .......... 313/110–117, 313/498

See application file for complete search history.

(56) References Cited

U.S. PATENT DOCUMENTS

| | | | | |
|---|---|---|---|---|
| 5,961,360 | A * | 10/1999 | Nishimura et al. | 445/24 |
| 7,499,215 | B2 * | 3/2009 | Levy | 359/460 |
| 7,654,878 | B2 * | 2/2010 | Morley et al. | 445/24 |
| 2006/0227087 | A1 * | 10/2006 | Hajjar et al. | 345/84 |
| 2006/0266980 | A1 * | 11/2006 | Sawaki et al. | 252/500 |
| 2008/0068295 | A1 * | 3/2008 | Hajjar | 345/3.2 |
| 2008/0278672 | A1 * | 11/2008 | Yano et al. | 349/193 |
| 2010/0277064 | A1 * | 11/2010 | Cok et al. | 313/506 |

* cited by examiner

*Primary Examiner* — Tracie Y Green

(74) *Attorney, Agent, or Firm* — Patterson & Sheridan, LLP

(57) ABSTRACT

Embodiments of the present invention generally provide an apparatus and method for forming a display screen assembly that comprises multiple panel assemblies which are positioned to form a tiled display device that has improved visual characteristics, is easy to assemble and has a reduced manufacturing cost. In general, each panel assembly is formed so that when it is positioned in a display screen assembly the grid pattern, formed by the gap between the illuminated regions in adjacent panel assemblies, can be minimized. In one embodiment, the unwanted visual effect of the grid pattern is mitigated by minimizing and controlling the space, or gaps, formed between the illuminated area in adjacent panel assemblies. Embodiments of the present invention may also provide an apparatus and method for forming a single panel assembly that is used to display an image.

41 Claims, 9 Drawing Sheets

MULTI-PANEL DISPLAY SCREEN HAVING A SUPPORTING FILM LAYER

BACKGROUND OF THE INVENTION

1. Field of the Invention

Embodiments of the present invention generally relate to a display screen used to display an image, and more specifically, a multi-panel display system that is adapted to display images to a large number of viewers.

2. Description of the Related Art

Electronic display systems are commonly used to display information from computers and other sources. Typical display systems range in size from small displays used in mobile devices to very large displays that are used to display images to thousands of viewers at one time. Tiled display walls provide a large-format environment for presenting large high-resolution images by synchronizing and coupling together the output from multiple distinct imaging systems. Such large displays may be created by tiling a plurality of smaller display devices together. For example, the video walls frequently seen in the electronic media typically use multiple display modules, such as flat-panel displays, which are tiled to create such large displays.

One issue with tiled displays is that the gap present between the constituent display modules can produce a grid pattern 101 visible to the viewer. FIG. 1A is a schematic plan view of a tiled display device 100 that has an array of display modules 102 that are each used to display portions of an image 107. In this configuration, the array of display modules 102 forms a grid pattern 101 found within the displayed image 107. FIG. 1B is a schematic perspective view of the tiled display device 100 that further illustrates the grid pattern 101 that may be visible to the viewer. Grid pattern 101 is formed by the gap 103 present between adjacent display modules 102. In order for tiled display device 100 to produce a uniform display, free of a visible grid pattern 101, the gap 103 between the formed images in each of the adjacent display modules 102 must be minimized. It is therefore important to minimize the space between the pixels found at the edge of each of the adjacent display modules 102 to minimize the un-illuminated region formed between the displayed images. The presence of a noticeable grid pattern in a display device 100 can be distracting for extended periods of viewing by a viewer.

In addition, display modules 102 of a tiled display device 100 need to be positioned in a precise and rigid fashion to prevent misalignment and displacement of display modules 102. In this way, the accurate alignment of the edges of display modules 102 and the parallel positioning of the viewing surfaces of display modules 102 can be maintained, further enhancing the uniform appearance of a displayed image.

As the foregoing illustrates, there is a need in the art for a tiled display device made up of rigidly supported display modules that have minimal gaps present between their illuminated areas to improve the quality of the displayed image and improve the viewer's visual experience.

SUMMARY OF THE INVENTION

Embodiments of the present invention generally provide a display screen, comprising a support frame having a supporting surface and a frame edge, a screen assembly having a viewing surface, an image surface and a screen edge, wherein the screen assembly is disposed on the supporting surface of the support frame, and a film layer that is substantially transparent to visible light and disposed over the viewing surface, at least a portion of the screen edge and at least a portion of the frame edge for the purposes of retaining the screen assembly against the support frame. In this configuration, embodiments may further comprise one or more light sources that are positioned to deliver radiation at a first wavelength to the image surface of the screen assembly. The screen assembly may also further comprise a light-emitting layer that is disposed on the image surface of the screen assembly, wherein the light-emitting layer comprises light-emitting regions that are each adapted to absorb the radiation delivered by at least one of the plurality of light sources and emit visible light at a second wavelength, different from the first wavelength, to the viewing surface.

Embodiments of the present invention may further provide a multi-panel display screen, comprising a plurality of display screen assemblies that each comprise a support frame having a supporting surface and a frame edge, a screen assembly having a viewing surface, an image surface and a screen edge, wherein the screen assembly is disposed on the supporting surface of the support frame, and a film layer that is substantially transparent to visible light and disposed over the viewing surface, at least a portion of the screen edge and at least a portion of the frame edge for the purposes of retaining the screen assembly against the support frame, wherein a screen edge of each of the display screen assemblies is positioned adjacent to a screen edge of at least one other display screen assembly, wherein a gap formed between the adjacent screen edges is less than the width of a pixel formed in at least one of the display screen assemblies.

Embodiments of the present invention may further provide a method of forming a display screen that is adapted to display an image, comprising aligning a first screen assembly having a first viewing surface, a first image surface and a first screen edge to a first support frame, and disposing a first film layer over at least a portion of the first screen assembly, and coupling at least a portion of the first film layer to a first frame edge of the first support frame for the purposes of retaining the first screen assembly against the first support frame, wherein the film layer is substantially transparent to visible light.

One or more embodiments of the invention provide a display screen secured to a support frame using a polymeric film layer and a method of forming such a display screen.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1A:
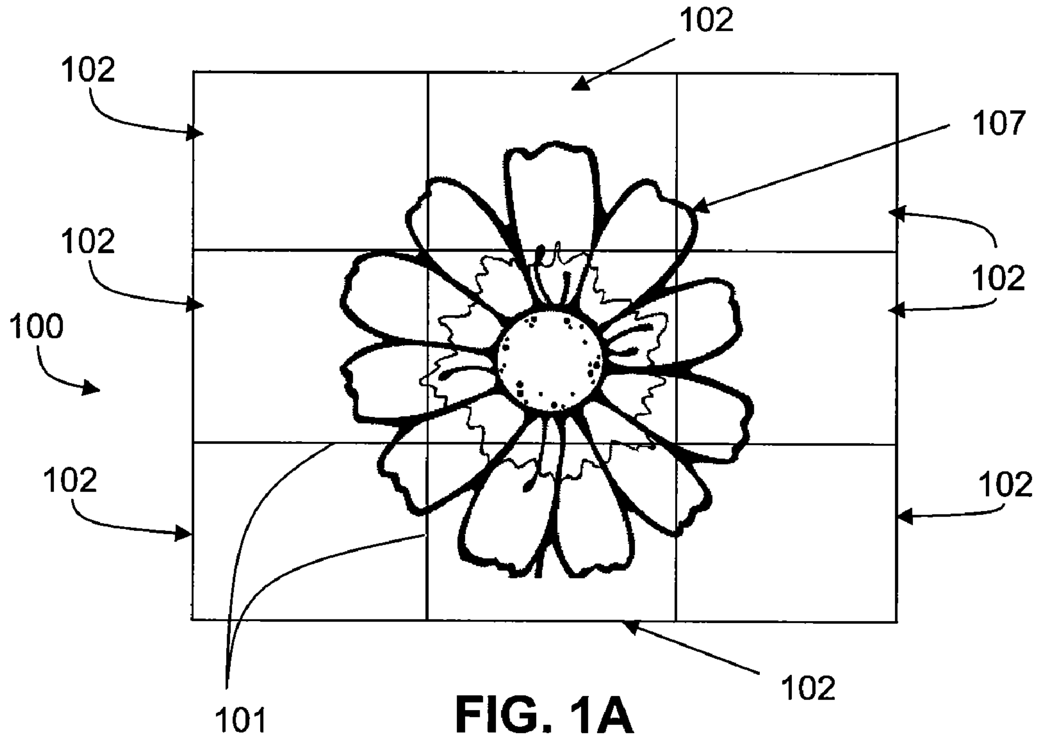
FIG. 1A is a schematic plan view of a tiled display device having a grid pattern that may be visible to the viewer.
Figure 1B:
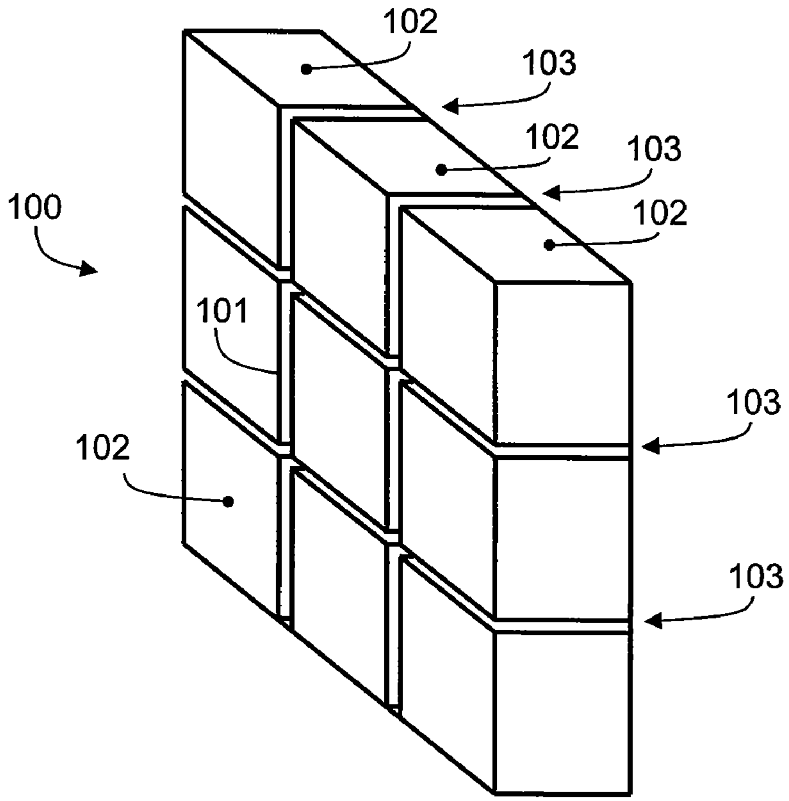
FIG. 1B is a schematic perspective view of a tiled display device having a grid pattern that may be visible to the viewer.

Embodiments of the present invention provide an apparatus and method for forming a display screen assembly 260 (FIG. 2A), or display screen, that comprises two or more panel assemblies 250 which are positioned to form a tiled display device that has improved visual characteristics, is easy to assemble and has a reduced material cost. Each panel assembly 250 is generally formed so that it can be positioned in a display screen assembly 260 so that the grid pattern 101, formed by the gap between the illuminated regions in adjacent panel assemblies, can be minimized. In one embodiment, the unwanted visual effect of the grid pattern 101 is mitigated by controlling the space, or gaps 103, formed between the illuminated area in adjacent panel assemblies. Embodiments of the present invention may also provide an apparatus and method for forming a single panel assembly 250 that is used to display an image.

Figure 2A:
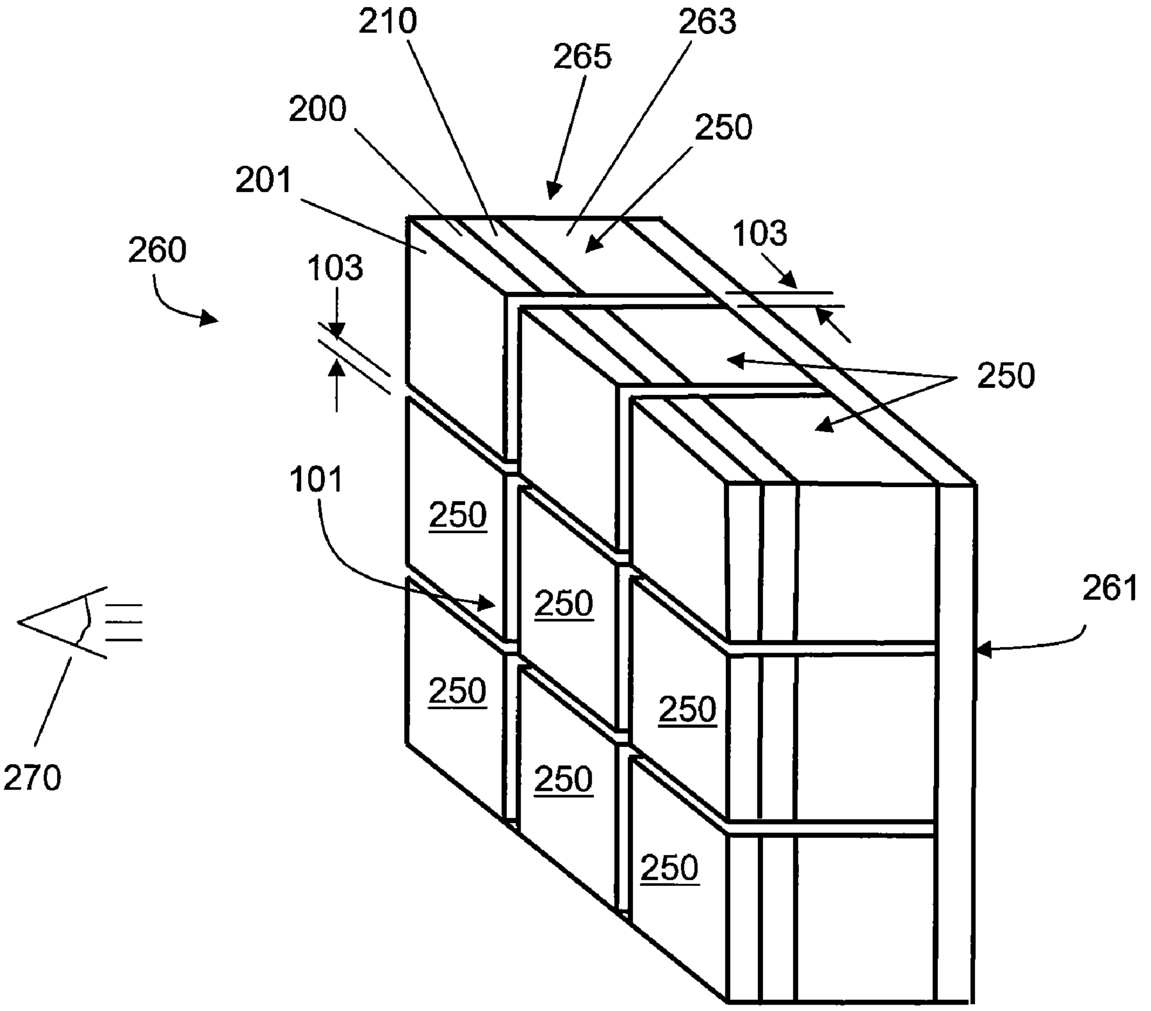
FIG. 2A is a schematic perspective view of a tiled display device having a grid pattern that may be visible to the viewer.

FIG. 2A illustrates one example of a three-by-three tiled display device 260, according to embodiments of the invention. Tiled display device 260 includes a plurality of panel assemblies 250 and a display frame 261. The display frame 261 is generally a structural component, such as a plurality of racks, frames or other similar devices that are used to support the panel assemblies 250 in a desirable alignment and pattern. The panel assemblies 250 may be bolted, glued, or otherwise joined to the display frame 261 so that the requisite structural rigidity and alignment is achieved to provide a uniform image.

Each of the panel assemblies 250 generally comprise a screen 200 and support assembly 265. The support assembly 265 generally contains the electronic components and structural elements that are able to support the screen 200 and, in combination with the screen 200, deliver an image to an audience 270 that are positioned to view the viewing surface 201 of the panel assembly 250. In one embodiment, the support assembly 265 comprises a support frame 210 that is part of, or connected to, an enclosure 263. The enclosure 263 generally supports and encloses the various electronic components and other devices that enable the formation of an image on a viewing surface 201 of the screen 200.

Figure 2B:
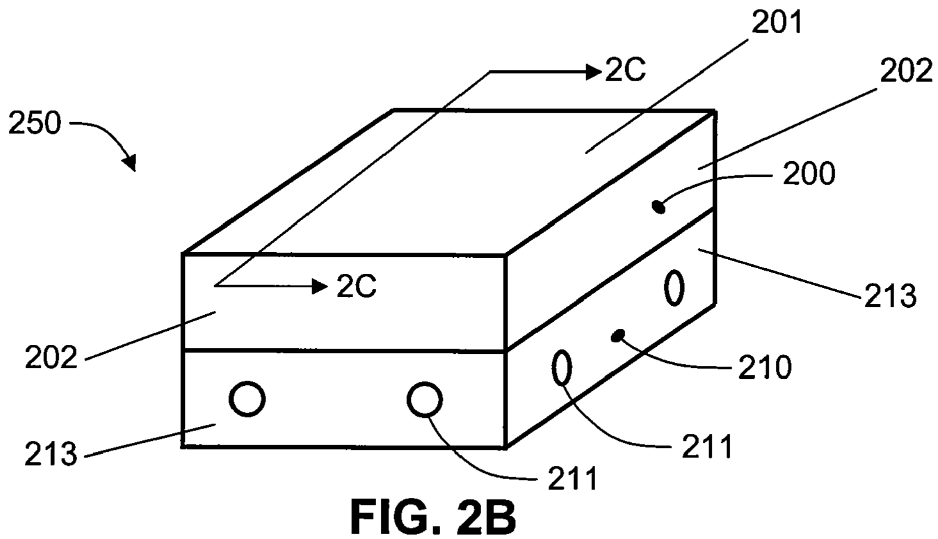
FIG. 2B is a schematic perspective view of a panel assembly that includes a display screen secured to a support frame, according to an embodiment of the invention.
Figure 2C:
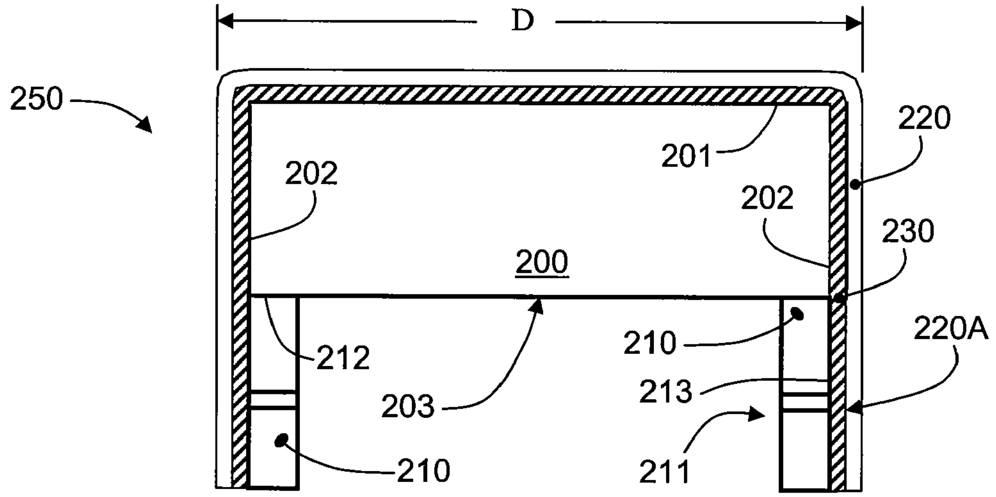
FIG. 2C is a schematic side cross-sectional view of a display screen and a support frame taken at section line 2C-2C in FIG. 2B.

FIG. 2B is a schematic perspective view of a panel assembly 250 that includes a screen 200 secured to a support frame 210, according to an embodiment of the invention. In general, the screen 200 can be any type of display, such as a flat panel display screen containing a liquid crystal display (LCD), electro-luminescent (ELD), cathode ray tube (CRT), field emission display (FED), organic light-emitting diode (OLED), plasma, projection system or other type of display screen device. In one embodiment, the panel assembly 250 is a laser based display system, which is further described below. The screen 200 generally comprises a viewing surface 201 and one or more screen edges 202. In one embodiment, the screen 200 is secured to a support frame 210 by a film layer 220 and an adhesive layer 230, both of which are depicted in FIG. 2C. Support frame 210 is a rigid support member that is configured to support and allow the screen 200 to be precisely positioned relative to the illumination-generating components positioned within the enclosure 263 and relative to other screens 200 in adjacent panel assemblies 250.

FIG. 2C is a schematic side view of screen 200 and support frame 210 taken along the section line 2C-2C in FIG. 2B. As shown, screen 200 is aligned with a support frame 210 and secured thereto by a film layer 220. In one embodiment, the film layer 220 is secured to the support frame 210 using a mechanical fastener, such as a mechanical clamp that is adapted to grip a portion of the film layer 220. In another embodiment, an adhesive layer 230 is disposed between the film layer 220 and the support frame 210. Film layer 220 may be a thin, polymeric film, such as Mylar® or other polyester material. In another example, the film layer 220 is formed from a polyethylene terephthalate (PET) or polyethylene naphthate (PEN) material. It is believed that a film layer 220 formed from materials, such as PET and PEN, has advantages over other conventional materials due to the coefficient of thermal expansion match between PET, or PEN, and the glass materials that are commonly used to form at least part of the screen 200 components. In one embodiment, the adhesive layer 230 may comprise an adhesive material that is applied to at least a portion of an inner surface of a film layer 220, and in some embodiments may be applied to substantially the entire inner surface of the film layer 220. In such an embodiment, the film layer 220 and the adhesive layer 230 may each be about 25 μm thick. In one embodiment, the combination of the film layer 220 and the adhesive layer 230 is less than about 50 μm. In one embodiment, a film layer 220 that has the adhesive layer 230 applied to an inner surface 220A is placed in contact with a frame edge 213 and/or a screen edge 202. In another embodiment, the adhesive layer 230 is applied to the surface of a frame edge 213 of the support frame 210 and a screen edge 202 of the screen 200 prior to securing the film layer 220 to the support frame 210 and the screen 200. In some cases, the adhesive layer 230 may also be applied to the viewing surface 201 of the screen 200.

In one embodiment, the optical properties of the film layer 220 include absorptive, reflective or diffusive type properties.

In one configuration, the film layer 220 is formed or further processed so that it will absorb and block any UV light delivered to one side of the film layer 220 from the illumination-generating components positioned within the enclosure 263 (e.g., laser radiation) and/or the other side of the film layer 220 by sunlight or other external light source. In one embodiment, the film layer 220 has an IR absorbing layer, which is commonly known as a blocking film, formed thereon. Also, in one embodiment, the film layer 220 could be have a multi-layer coating disposed thereon to control the film layer 220's reflection characteristics caused by ambient light, or enhance the transmission efficiency of the display (e.g., commonly known as anti-reflective film or low-reflective film). In one embodiment, the film layer 220 may also be formed to diffuse light to control the brightness viewing angle, reduce glare or specular reflection created by ambient light striking the panel assembly 250 (e.g., commonly known as anti-glare). In general, the above absorptive, reflective or diffusive properties of the film layer 220 can be formed by depositing one or more layers on the film layer 220. In one example, the one or more deposited layers are formed by a wet deposition, an evaporative deposition or a sputtering type deposition process. In some cases the one or more layers are formed during the extrusion or molding processes used to form the film layer 220 from a web or sectional piece. In some cases, the film layer 220 may be shipped with a separate removable liner that is used to protect the surface of the film layer 220. In one embodiment, the removable liner is generally formed so that it can be removed after the film layer 220 is installed over the screen.

The adhesive layer 230 generally includes an adhesive material that forms a bond between the film layer 220 and the various support assembly 265 components, which over time will not prematurely de-bond, creep or otherwise fail. In embodiments in which adhesive layer 230 covers the viewing surface 201, the adhesive layer 230 needs to also be optically transparent and is selected so that it will not optically degrade over time due to exposure to UV and/or visible light. In general the adhesive layer 230 should be formed from a material that has a low viscosity and/or a desirable strength so that it will not flow or creep over time. In one embodiment, the adhesive layer 230 includes a pressure-sensitive adhesive (PSA) and/or a contact adhesive. Pressure sensitive adhesives and contact adhesives generally adhere to most surfaces with a very slight pressure. They are available in solvent and latex or water-based forms. Pressure sensitive adhesives and contact adhesives are often based on non-crosslinked rubber adhesives, acrylics, or polyurethanes. In some cases, pressure sensitive adhesives form visco-elastic bonds that can adhere without the need of more than a finger or hand generated pressure, and require no post processing steps to form a bond, such as activation by the application or removal of a solvent material or the application of heat. In one example, the pressure sensitive adhesive is based on a non-crosslinked rubber adhesive that is disposed in a latex emulsion or solvent-borne form. Embodiments of the invention contemplate the use of any PSA or contact adhesive that meets the requirements for adhesive layer 230 as set forth herein. In one example, the adhesive is a pressure sensitive adhesive, such as PD-S1 that can be purchased from Panac Co., LTD of Tokyo, Japan.

As shown, screen 200 rests on a support surface 212 of a support frame 210. In one embodiment, to facilitate precise alignment of the screen 200 with the support frame 210, keyed alignment features may be incorporated into the bottom surface 203 of the screen 200 and the support surface 212 of the support frame 210. For example, holes slots, or other openings may be etched or otherwise formed in the bottom surface 203, and corresponding tabs or other projections may be machined or otherwise formed on the support surface 212 of the support frame 210. In another embodiment, alignment of the screen 200 with the support frame 210 is maintained during assembly by a jig or other external device while the film layer 220 is applied thereto. In one embodiment, film layer 220 and adhesive layer 230 are only applied to portions of the frame edge 213 and the screen edge 202, leaving the viewing surface 201 free of the adhesive layer 230. In another embodiment, the structural support provided by the film layer 220 is enhanced by applying the film layer 220 and the adhesive layer 230 to the surface of frame edge 213, screen edge 202, and viewing surface 201 as one contiguous sheet. This configuration can reduce the need for high precision manufacturing processes, improve the structural strength of formed assembly and facilitate the repeatable mass production of the panel assembly 250. Also, the configuration described herein generally has advantages over configurations that require the support frame 210 to be precisely machined to hold and precisely retain the screen 200, since the precise alignment of the screen 200 to the important components in the panel assembly 250 can be accomplished by use of manufacturing alignment fixtures and the film layer 220. The manufacturing alignment fixtures are thus used to define a desired relationship between the screen 200 and various panel assembly 250 components, so that when a bond is formed between the film layer 220 and the panel assembly 250 components the relationship between the screen 200 and the panel assembly 250 components is well defined. In this case, a lower precision support frame can be used to support the screen 200 and the precise position of the screen 200 can be "locked" by bonding regions of the film layer 220 to the screen 200 and frame edge 213. In one example, the support frame 210 comprises a plurality of sheet metal plates that are glued together to form a rigid structure, thus reducing the cost and complexity of the panel assemblies 250. Moreover, to assure that the screen 200 remains in a defined orientation relative to the support frame 210 over extended periods of time it is desirable to make sure that the film layer 220 is placed in tension when it is bonded to the support frame 210. In configurations where an adhesive layer 230 is used to bond the film layer 220 to the support frame 210 it is generally desirably to select an adhesive material that will not relax or creep due to the tension applied to the film layer.

In one embodiment, to improve the clarity of the image received at the viewing surface it is desirable to select and dispose an adhesive layer 230 between the film layer 220 and the viewing surface 201 that has an index of refraction that matches the materials found in the screen 200. It is believed that the placement of the adhesive layer 230 between the film layer 220 and the viewing surface 201 will improve the clarity of a formed image over a configuration that has an air gap formed between the film layer 220 and the viewing surface 201 (e.g., un-bonded configuration).

Figure 2D:
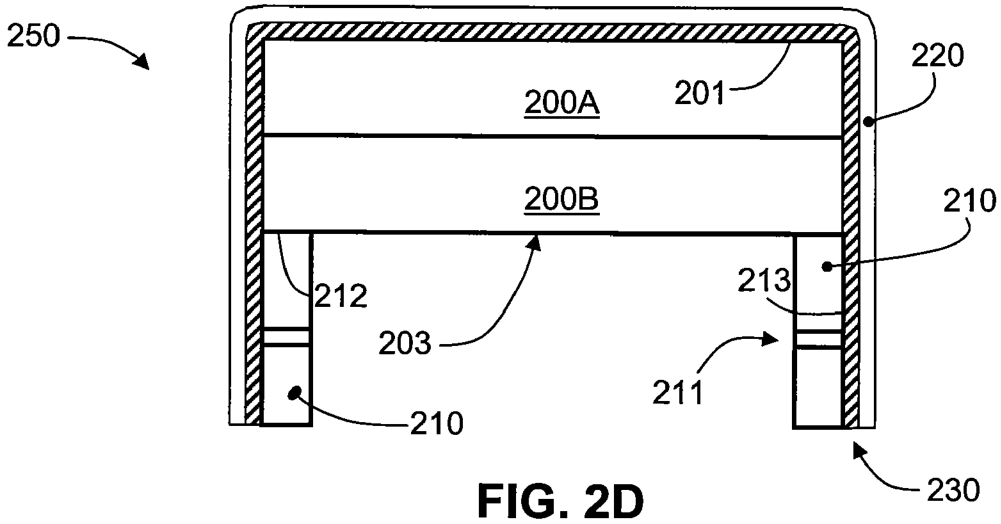
FIG. 2D illustrates is a schematic side cross-sectional view of a display screen that is comprised of multiple display subassemblies, according to an embodiment of the invention.

FIG. 2D illustrates an embodiment of panel assembly 250, in which the screen 200 is an assembly that comprises multiple display subassemblies, 200A, 200B. An example of a multi-component screen 200 comprising two or more sub assemblies is further described below in conjunction with FIGS. 5A, 6 and 7. As shown, the display subassembly 200A and the display subassembly 200B are aligned with and secured to support frame 210 using a film layer 220 and an adhesive layer 230. Therefore, in one embodiment, by use of only the film layer 220 to support and retain two or more display subassemblies (e.g., display subassemblies 200A, 200B), the need for separate edge mounted structural elements to retain the subassemblies can be eliminated. Therefore, by removing the un-necessary edge mounted structural elements, the gap 103 formed between adjacent panel assemblies 250 in a display screen assembly 260 can be minimized or reduced. The film layer 220 can also be used to hold and retain unconnected display subassemblies 200A, 200B in a desired position and orientation relative to each other by fixing the position of the screen edges (i.e., reference numeral 202) of each of the display subassemblies 200A, 200B relative to each other. In one example, where the display subassembly 200A comprises a plurality of phosphor regions and the display subassembly 200B comprises a Fresnel lens, such as found in a laser based display system which is discussed below, the film layer 220 is used to assure that there is a fixed air gap between the two display subassemblies.

In one embodiment of the panel assembly 250, as shown in FIG. 2B, the support frame 210 provides a means by which the screen 200 can be fastened to other similar display screens to form a display screen assembly 260. To that end, according to one embodiment, the support frame 210 includes through-holes 211 or other means for securing the support frame 210 to other similar support frames making up the display screen assembly 260. Support frame 210 may also include keyed alignment features, e.g., mated projections and protrusions. The alignment features can further facilitate the precise alignment of the screen 200 with other similar display screens when it is fastened to other such display screens to form the tiled display device. One example of a tiled display device is described above in conjunction with FIG. 2A.

Figure 3A:
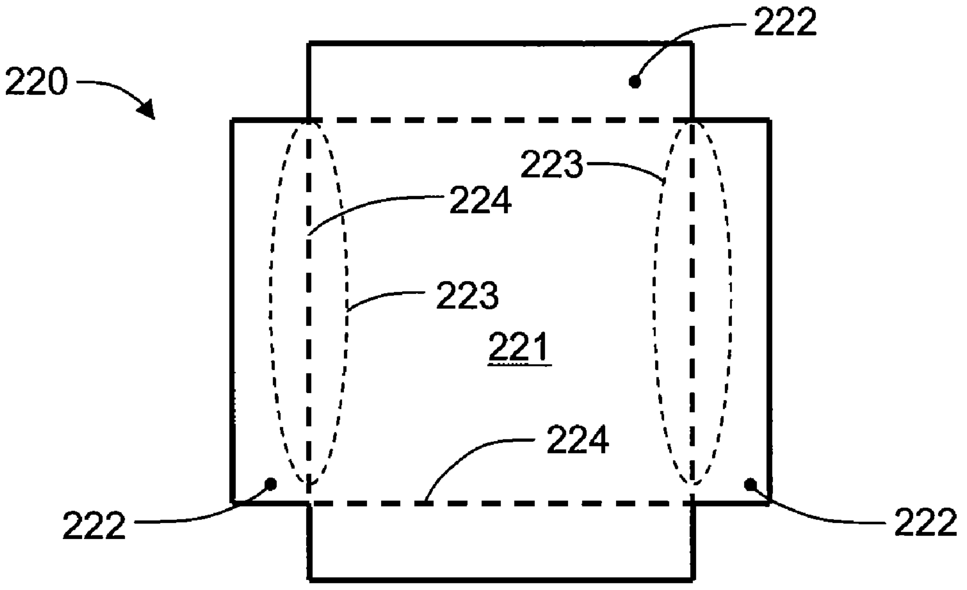
FIG. 3A is a plan view of a film layer that includes a viewing region and flaps, according to an embodiment of the invention.

In one embodiment of the panel assembly 250 configurations illustrated in FIGS. 2C and 2D, the film layer 220 comprises a viewing region and a plurality of flaps. FIG. 3A is a plan view of the film layer 220 prior to the application of the film layer 220 to the screen 200 and the support frame 210, and illustrates a configuration of the film layer 220 that includes a viewing region 221 and flaps 222. Viewing region 221 is generally the portion of the film layer 220 that covers the viewing surface 201 when it is disposed over the screen 200. In one embodiment, the flaps 222 are the portions of the film layer 220 that are folded down into contact with the screen edge 202 and/or the frame edge 213 when the film layer 220 is applied to the screen 200 and the support frame 210. Each of the flaps 222 are joined to the viewing region 221 by a respective connecting region 223. Each of the connecting regions 223 are a portion of the film layer 220 proximate a fold line 224 for a given flap 222, wherein each such fold line is aligned with a corner of screen 200 formed by the viewing surface 201 and one of the screen edges 202. The connecting regions 223 are generally used to ensure the stable and precise positioning of the screen 200, which is described below in conjunction with FIGS. 4A, 4B. While the film layer 220, shown in FIG. 3A, illustrates a configuration where each of the flaps 222 span the length of an edge of the viewing region 221, this configuration is not intended to be limiting as to the scope of the invention, since, for example, flaps 222 that are less than the full length of an edge of the viewing region 221 may also be used. However, in some configurations where the film layer 220 is adapted to block one or more wavelengths of light passing through the screen edge 202, such as UV wavelengths, it is desirable to assure that the flaps 222 substantially cover the screen edge 202.

Figure 3B:
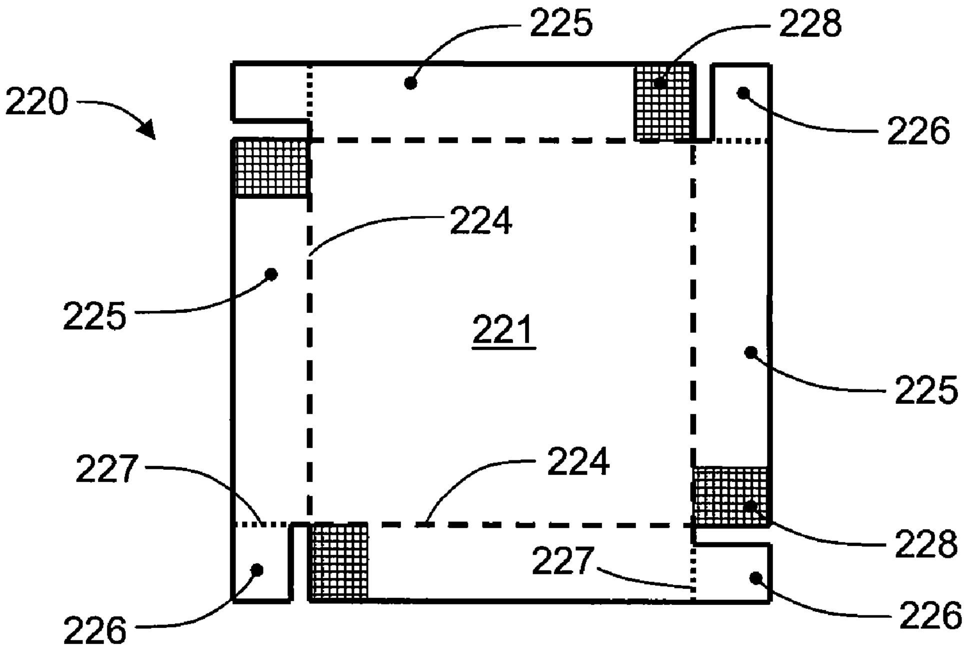
FIG. 3B is a plan view of film layer illustrating a configuration of a film layer with flaps that can be disposed over and bonded to a portion of an adjacent flap, according to an embodiment of the invention.

In one embodiment, one or more flaps may be fixed not only to screen edge 202 and frame edge 213 as depicted in FIGS. 2C, 2D, but may also be fixed to a portion of another flap or part of an adjacent screen edge 202 or frame edge 213. FIG. 3B is a plan view of a film layer 220 prior to the application of the film layer 220 to a screen 200 and a support frame 210, and illustrates a configuration of a film layer 220 having flaps 225 that can be disposed over and bonded to a portion of an adjacent flap or other structural elements, according to an embodiment of the invention. In such an embodiment, each flap 225 includes a secondary flap 226, which is defined by a secondary fold line 227. During installation, the viewing region 221 of the film layer 220 is bonded to the viewing surface 201, and the flaps 225 are bonded to the screen edges 202 and the frame edges 213. Then each of the secondary flaps 226 are folded at a secondary fold line 227 and bonded to the region 228 of the adjacent flap 225. Thus, the flaps 225 are folded “downward” along the fold lines 224 onto the screen edges 202 and the frame edges 213, and the secondary flaps 226 are folded orthogonally with respect to the fold lines 224. Alternately, in some configurations the flaps 225 are further relieved (not shown) so that the secondary flaps 226 can be directly bonded to a portion of a surface to which an adjacent flap 225 is bonded. In either configuration, a lightproof seal is formed around the screen 200 and the structural rigidity of the panel assembly 250 is generally improved. One of skill in the art, upon reading the disclosure herein, can readily devise other configurations and shapes for the secondary flaps 226.

In one embodiment of the configuration illustrated in FIG. 3B, the secondary flaps 226 are configured to overlap and substantially cover any gaps found between adjacently positioned flaps 225. In one embodiment, the secondary flaps 226 are configured to substantially cover the gaps formed between the flaps 225 covering portions of the screen edge 202 to prevent any light from entering or exiting the screen 200 without passing through the film layer 220. In this case, since the film layer 220 completely covers the viewing surface 201 and screen edges 202 the optical properties of the film layer 220 can be used to completely filter, reflect and/or absorb the light passing through the screen 200. In one embodiment, it is desirable to add an amount of the adhesive, or a separate conventional sealant, to the gaps formed between the flaps 225 or secondary flaps 226 to prevent moisture or other contamination from making its way between the film layer 220 and the screen 200, and affecting the displayed image.

Figure 4A:
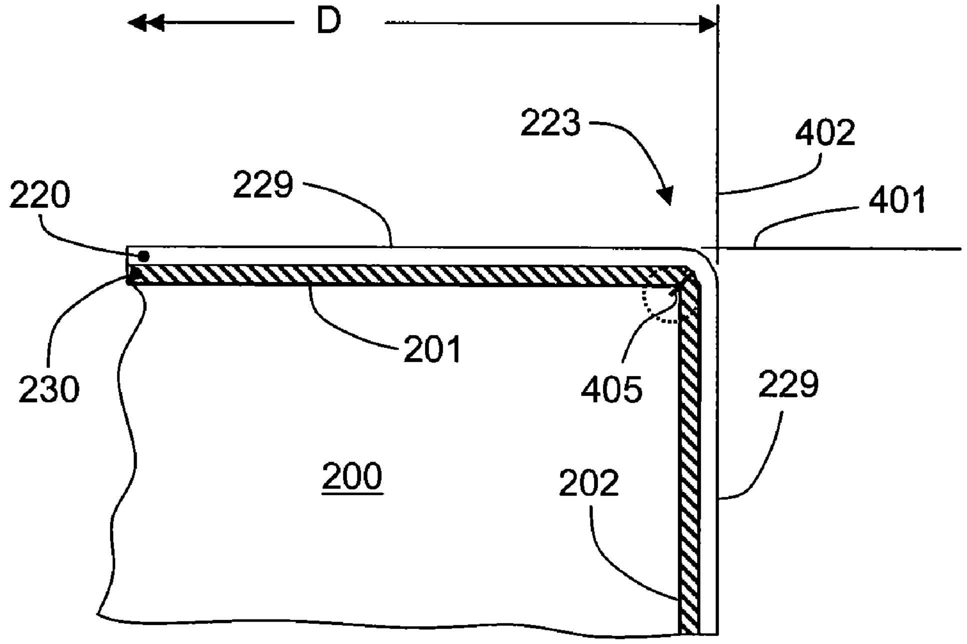
FIG. 4A illustrates a preferred configuration of a connecting region after a film layer has been bonded to a display screen and support frame, according to an embodiment of the invention.
Figure 4B:
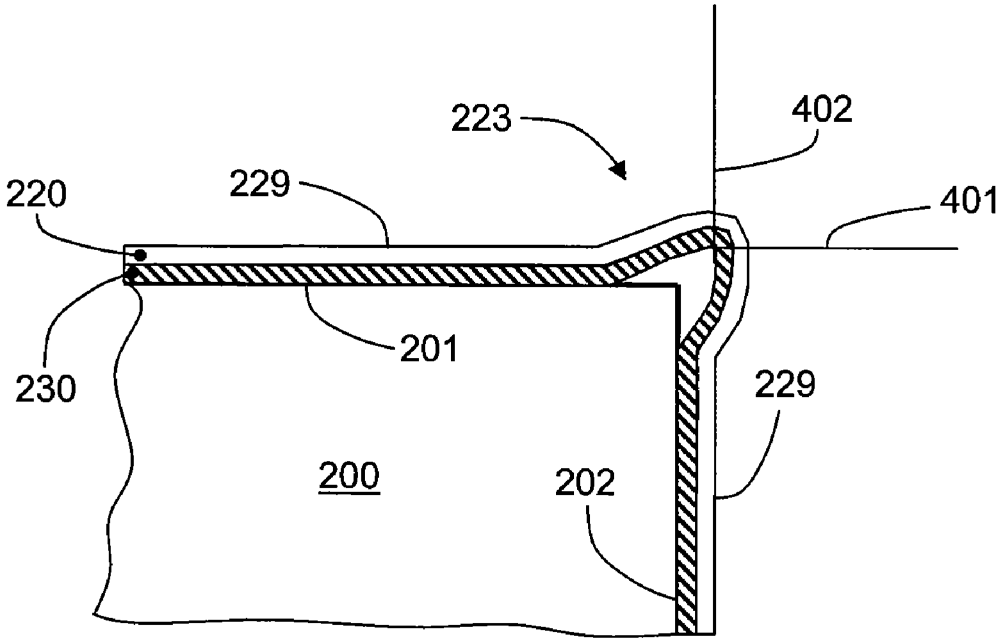
FIG. 4B illustrates a sub optimal configuration of a connecting region after a film layer has been bonded to a display screen and support frame.

FIG. 4A illustrates a preferred configuration of a connecting region 223 after the film layer 220 has been bonded to the screen 200 and the support frame 210, according to an embodiment of the invention. To prevent slippage of the screen 200 with respect to the film layer 220 and/or the support frame 210, the connecting region 223 and the adhesive layer 230 for each flap, e.g., flaps 222 or flaps 225, are placed in full contact with the viewing surface 201 and the screen edge 202. In one embodiment, it is desirable to assure that the surface area of the portion of a flap 222 in contact with the support frame 210 is equal to at least two times the thickness of the screen 200 (e.g., measured in a direction normal to the viewing surface 201) by the length of the screen edge 202. In one example, the width of the flap 225 that is bonded to the frame edge 213 is at least 25 mm long, and is positioned on all four sides of a rectangular shaped panel assembly 250. Thus, no portion of connecting region 223 may extend above the plane 401 defined by the upper surface 229 of the film layer 220 disposed over the viewing surface 201. Similarly, it is generally desirable to assure that no portion of the connecting region 223 may extend past the plane 402 defined by the upper surface 229 of the film layer 220, which is bonded to the screen edge 202 and/or the frame edge 213. FIG. 4B illustrates a sub optimal configuration of connecting region 223 after the film layer 220 has been bonded to the screen 200 and the support frame 210. In FIG. 4B, the connecting region 223 extends past plane 401 and plane 402, thereby forming a loop or fold in the film layer 220 that is not in contact with either the viewing surface 201 or the screen edge 202. Such a loop can affect the gap 103 (FIGS. 2A and 5B) formed between adjacently positioned panel assemblies 250, and also the structural rigidity of the panel assembly 250, which can affect the light emission from each panel assembly, result in shifting of the position of the screen 200 over time and/or during installation, and reducing device reliability. The loops or folds in the portions of the connecting region 223 are thus defects in the film layer 220, which can also be described as buckles or bubbles in the film layer.

In configurations where the film layer 220 is bonded to the screen 200 and the support frame 210, placing the film layer 220 under tension results in a more rigid structure and more repeatable external dimension "D" (FIGS. 2C and 4A), thereby securing the screen edge 202 to the frame edge 213 along the length of the surface of the frame edge 213, and in essence self-aligning the screen to the frame. However, greater tension in film layer 220 also increases the likelihood of the film layer 220 tearing and/or the adhesive layer to de-bonding or relaxing under the applied load. It is believed that when the film layer 220 has an inner bend radius 405 that is substantially equal to the combined thickness of the film layer 220 and the adhesive layer 230, the balance between useful tension on the film layer 220 and the potential tearing of flat film 220 is optimized. In one embodiment, the thickness of film layer 220 is about 25 microns and the thickness of adhesive layer 230 is about 25 microns. In such an embodiment, an optimal configuration of the connecting regions 223 on the film layer 220 is with an inner bend radius 405 of approximately 50 microns. Alternatively, the connecting regions 223 of the film layer 220 may be configured with a bend radius 405 that is more than a quarter of the combined thickness of the adhesive layer 230 and the film layer 220, and less than twice the combined thickness of adhesive layer 230 and film layer 220. In another embodiment, the connecting regions of the film layer 220 may be configured with a bend radius 405 that is less than twice the combined thickness of the adhesive layer 230 and the film layer 220. In one embodiment, it is contemplated that the thickness of the film layer 220 and/or the adhesive layer 230 in the connecting region 223 may be reduced in thickness with respect to other portions of the film layer 220, in order to facilitate bonding of the film layer 220 to the screen 200 having an optimal inner bend radius. In some configurations, to avoid tearing of the film layer 220 it is desirable to chamfer, 45 degree cut, or radius the edges of the screen 200. In this configuration, no inside corners exists that can create a location for the film layer 220 to tear.

In one embodiment, as shown in FIG. 2A, each of the two or more panel assemblies 250 are positioned on the display frame 261 to form a tiled display device that has small gaps 103 between the illuminated regions formed in each panel assembly. It is believed that significant visible lines will be perceptibly reduced between each of panel assemblies 250 when the gap 103 between is maintained at a distance that is substantially twice the thickness of film layer 220 and adhesive layer 230 combined. In one embodiment, as discussed below, it is further desirable to assure that the combined thickness be smaller than the width of a pixel found in the panel assemblies 250. In another embodiment, it is further desirable to assure that the combined thickness be smaller than half the width of a pixel found in the panel assemblies 250, so that the grid line(s) formed when positioning two panel assemblies next to each other can be minimized.

Figure 5A:
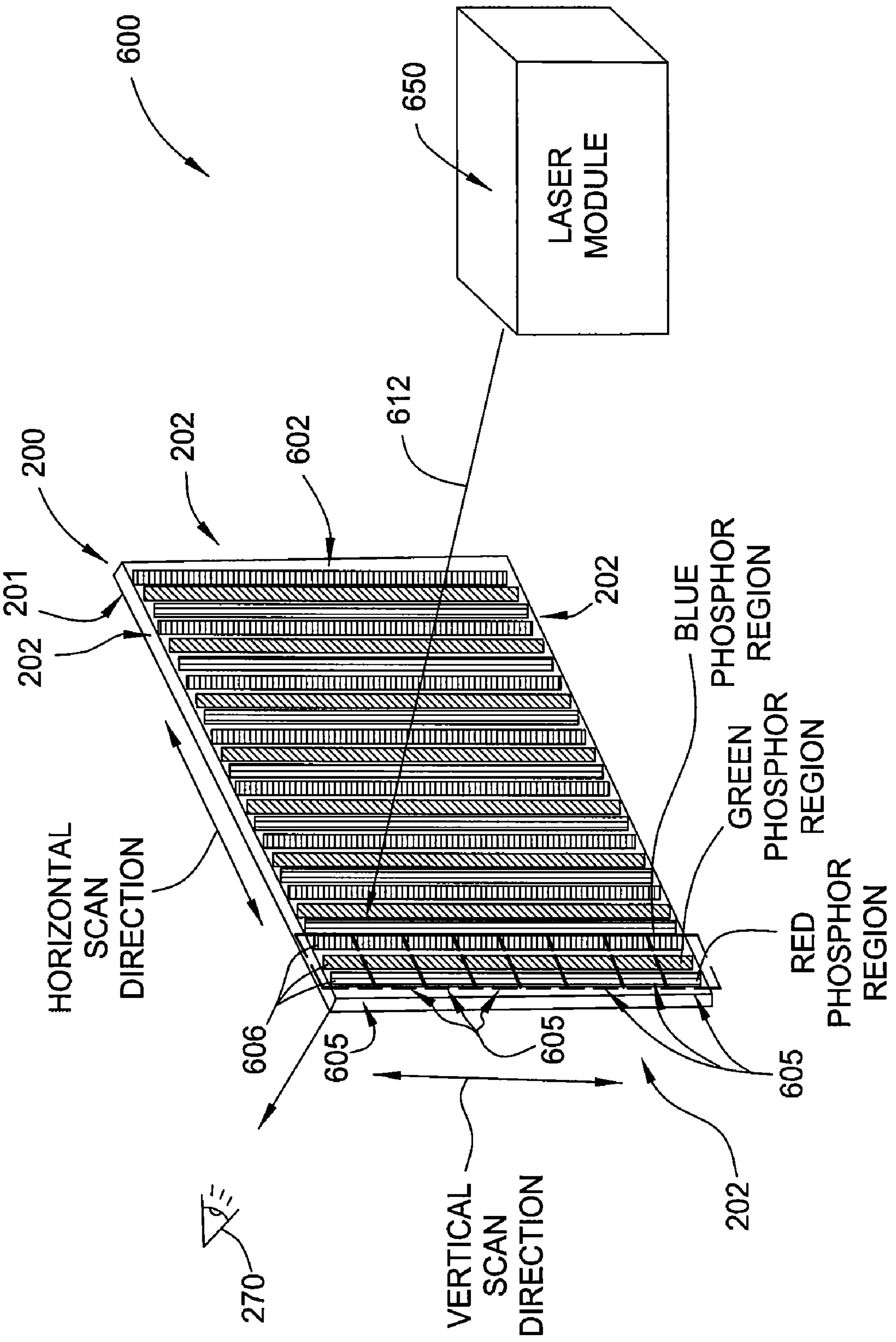
FIG. 5A illustrates an example of an optical modulation design for a laser-based display system that may benefit from embodiments of the invention.
Figure 6:
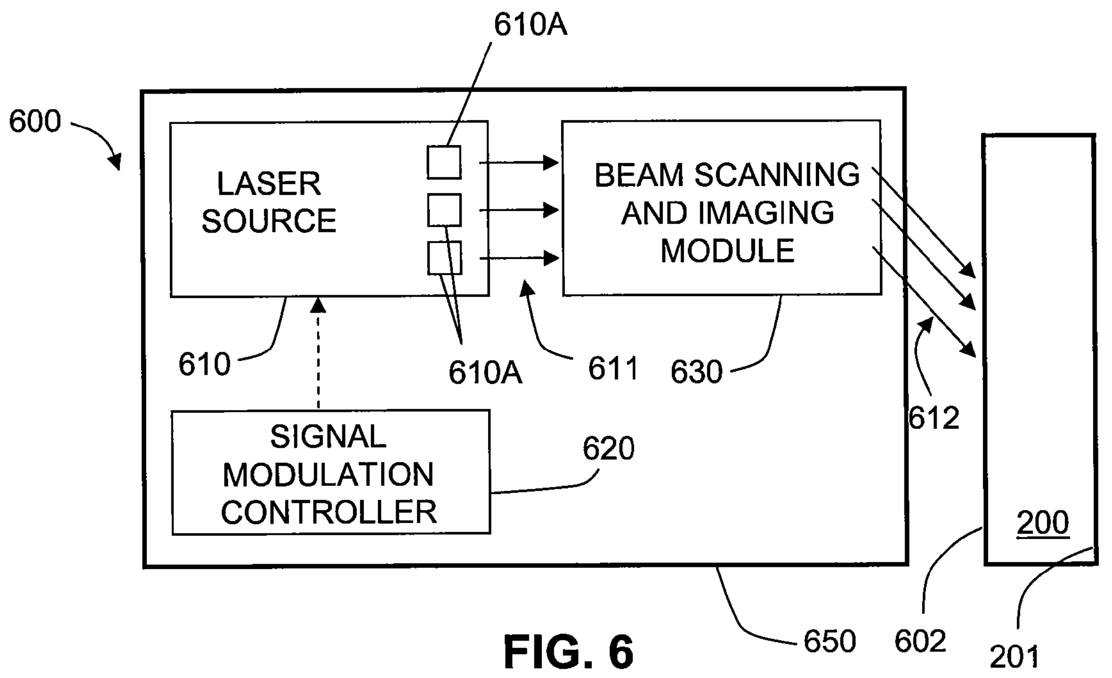
FIG. 6 illustrates an example of an optical modulation design for a laser-based display system that may benefit from embodiments of the invention.

As noted above, in one embodiment, the panel assemblies 250 are laser-based display systems. FIG. 5A illustrates one embodiment of a laser-based display system 600 having a plurality of phosphor regions formed on the image surface 602 of the screen 200. As shown, a laser containing laser module 650 and an audience 270 are positioned on two opposite sides of the screen 200, i.e., the rear side and the front side of the screen 200, respectively. FIG. 6 illustrates an example of an optical modulation design for a laser-based display system 600 that may benefit from the embodiments of the invention, described herein, and which may be incorporated into the enclosure 263 of each of panel assemblies 250. In one embodiment, the laser-based display system 600 generally includes a screen 200 having phosphor regions and a laser module 650. The laser module 650 is used to produce a scanning laser beam to excite the phosphor material disposed on the image surface 602 (e.g., back surface 203 in FIG. 2C) of the screen 200. The laser module 650 is adapted to deliver one or more scanning optical beams, or modulated beam 612, that are scanned along two different directions, for example, the horizontal direction and the vertical direction, in a raster scanning pattern on the image surface 602 of the screen 200. In one embodiment, the phospor regions are parallel regions or stripes. The laser module 650 may be a single mode laser or a multimode laser. The laser may also be a single mode along the direction perpendicular to the elongated direction phosphor regions to have a small beam spread that is confined with the width of each phosphor region. Along the elongated direction of the phosphor regions, this laser beam may have multiple modes to spread over a larger area than the beam spread in the direction across the phosphor region. An example of a laser based display system is further described in the commonly assigned U.S. patent application Ser. No. 12/123,418, entitled "Multilayered Screens with Light-Emitting Stripes for Scanning Beam Display Systems," filed May 19, 2008, which is incorporated herein in its entirety.

In one example, to form an image on the screen 200 using a laser-based display system 600, a laser source 610 produces a laser beam 611 that is directly modulated to form an image by delivering desired amounts of optical energy to each of the red, green, and/or blue phosphor regions found within multiple image pixel elements 605 formed on the image surface 602. Laser module 650 in this implementation includes a signal modulation controller 620, which modulates the output of the laser source 610 directly. For example, the signal modulation controller 620 may control the driving current of a laser diode, which is the laser source 610. A beam scanning and imaging module 630 then projects the modulated beam 612 to screen 200 to excite the color phosphors. Alternatively, laser source 610 is used to generate a CW un-modulated laser beam and an optical modulator is used to modulate the generated CW laser beam with the image signals in red, green and blue. In this configuration, a signal modulation controller is used to control the optical modulator. For example, an acousto-optic modulator or an electro-optic modulator may be used as the optical modulator. The modulated beam from the optical modulator is then projected onto the screen 200 by the beam scanning and imaging module 630. In one embodiment, the laser source 610 further comprises two or more lasers 610A that are used in conjunction with other components in the laser module 650 to deliver an array of beams to the phosphor regions disposed on the image surface 602 formed in the screen 200. In one embodiment, each of the lasers 610A are a UV wavelength laser, such as a 405 nm laser source.

Referring to FIG. 5A, which further illustrates the structure of an image region, or image pixel element 605, that outputs light for forming and delivering images to the viewing surface 201 of the screen 200 by the optical emission of visible light created by the laser excitation of the phosphor containing regions. An array of image pixel elements 605 are used to form the image at the viewing surface 201, by individually controlling the composite color and image intensity at each image pixel element's location. In the illustrated example, the dimension of the pixel region is defined by the physical width of the three color regions, or stripes, in one dimension (e.g., the horizontal scan direction perpendicular to the color stripes) and the control of the beam spot size for a particular image information in the other dimension without a physical boundary of the pixel region (e.g., the vertical direction parallel to the color stripes). It should be noted that the beam spot size can also be affected by the angular position of the laser emitted radiation relative to the image surface. In other implementations, both dimensions of the image pixel element 605 may be defined by physical boundaries. Each pixel region 605 includes three sub-pixel regions 606, which emit light in three different colors, such as red, green and blue. In each image pixel element 605, the respective portions of the three parallel light emitting regions are optically active regions that emit visible light and any unwanted space between the light-emitting stripes is filled with a non-light-emitting material forming a divider located between the light-emitting stripes. In one example, each of sub-pixels 660 are spaced at about a 500 to about 550 μm pitch. In one example, each of sub-pixels 660 are spaced at a pitch between about 125 μm and about 1000 μm. In general, it is desirable to form the image pixel elements 605 as close as practicable to the screen edges 202 to minimize the gap 103 formed between images in adjacent panel assemblies 250.

Figure 5B:
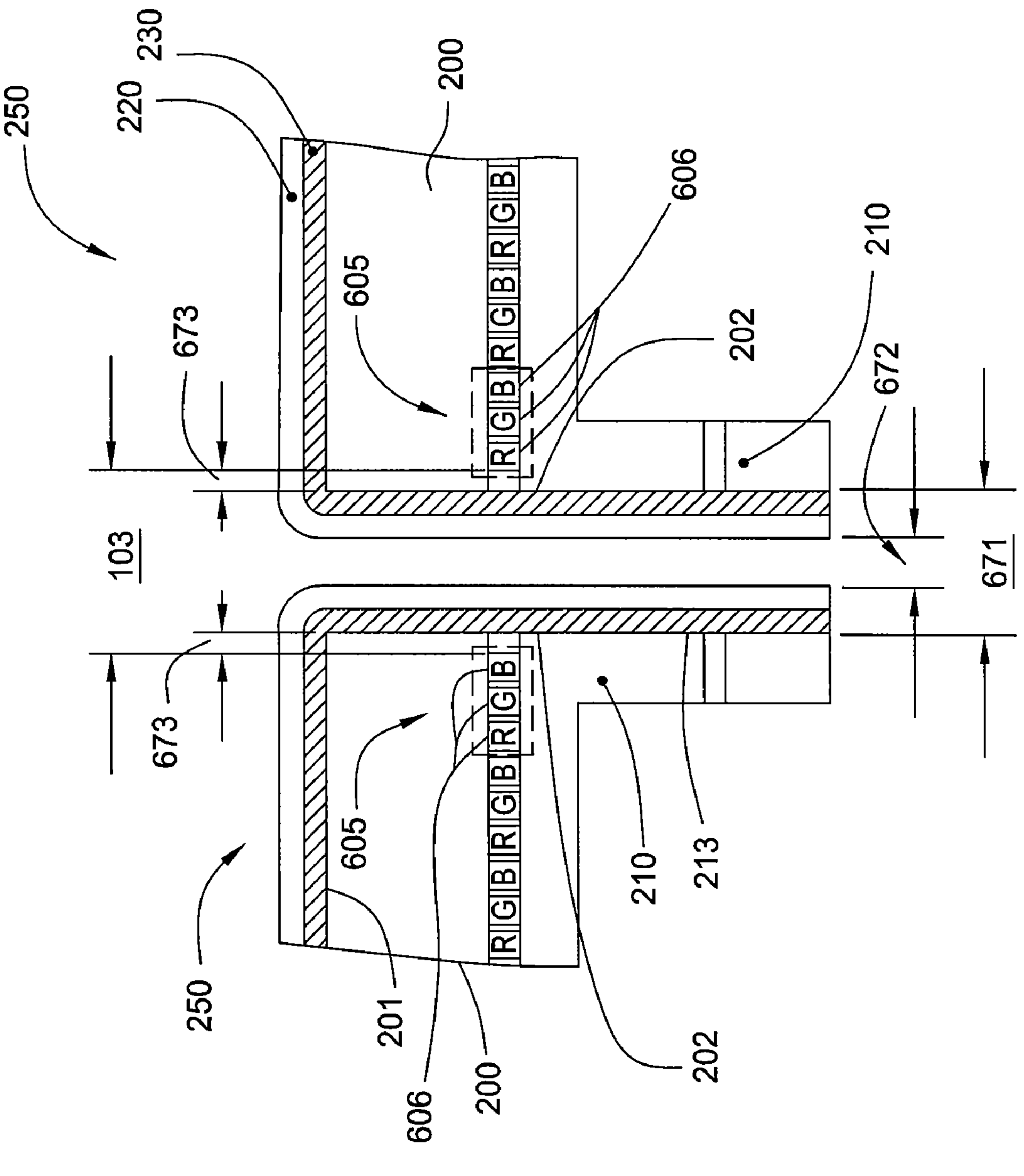
FIG. 5B is a schematic side partial cross-sectional view of two adjacent panel assemblies according to an embodiment of the invention.

FIG. 5B is a side cross-sectional view that illustrates the alignment and configuration of the gap 103 formed between two adjacent panel assemblies 250 positioned in a display screen assembly 260. As discussed above, the gap 103 is generally defined as spacing between the image formed in adjacent panel assemblies 250. In general, the gap 103 is defined as the distance between the sub-pixel regions 606 in each of the image pixel elements 605 nearest the screen edge 202 and/or frame edge 213 of adjacent panel assemblies 250. In one embodiment, as shown in FIG. 5B, the gap 103 is equal to the spacing between the screen edges 202 of adjacent panel assemblies 250 (e.g., edge gap 671) plus the distance between the screen edge 202 and the edge of the image pixel element 605 nearest the screen edge 202 in each of the adjacent panel assemblies 250 (e.g., two times a pixel gap 673). In one example, the edge of the sub-pixel region 606 closest to the screen edge 202, or pixel gap 673, is between about 0 and about 25 from the screen edge 202 measured along the image surface 602, where when the pixel gap 673 is equal to zero the subpixel is at the edge of the screen. In another example, the pixel gap 673 is no more than a sub-pixel width. In one embodiment, due to the desirable placement of the pixel elements 605 at the screen edge 202, the gap 103 is substantially equivalent to the spacing between the adjacent screen edges 202, or equal to the edge gap 671. While FIG. 5B illustrates a gap 103 configuration that comprises an air gap 672, which is formed between the adjacent panel assemblies 250, this configuration is not intended as to limiting to the scope of the invention described herein, since it is generally desirable to not form an air gap 672 to reduce the spacing between the adjacent projected images. Due to tolerance and alignment issues between the adjacent panel assemblies 250, a small air gap 672 may exist. However, in some cases it is desirable to try to minimize the size of the air gap 672 as much as possible.

In operation, modulated beam(s) 612 are scanned spatially across screen 200 to excite the different red, green and blue light generating phosphor regions at different times. Accordingly, the modulated beam 612 carries the image signals for the red, green, and blue for each image pixel at different times and for different image pixel elements 605 at different times. Hence, the modulation of modulated beam 612 is coded with image information for different pixels at different times to map the timely coded image signals in modulated beam 612 to the spatial pixels on screen 200 via the beam scanning. A laser-based display system 600, including laser module 650, laser source 610, signal modulation controller 620, beam scanning and imaging module 630, and an optical modulator, is described in greater detail in co-pending patent application Ser. No. 12/123,418, entitled "Multilayered Screens with Light-Emitting Stripes for Scanning Beam Display Systems," filed May 19, 2008, which is incorporated herein in its entirety.

Figure 7:
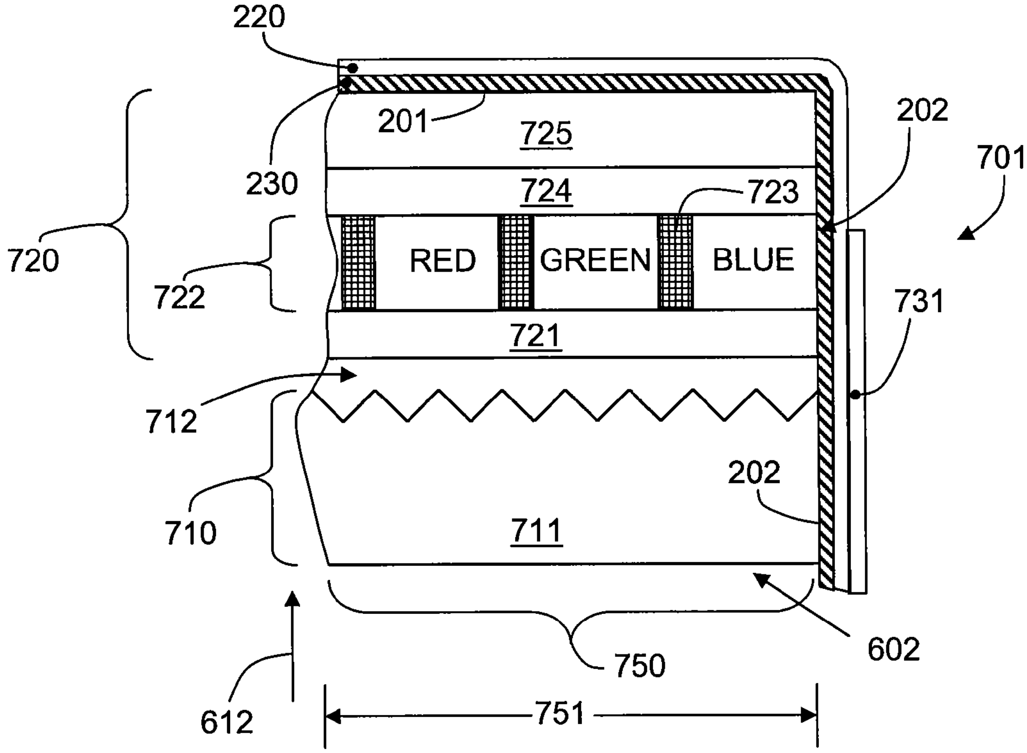
FIG. 7 is a partial schematic side view of a screen of a laser-based display system, according to one embodiment of the invention.

FIG. 7 is a partial schematic side view of one embodiment of a screen 200 of a laser-based display system 600. In one embodiment, screen 200 includes two subassemblies: a Fresnel lens assembly 710 and an RGB assembly 720. In one embodiment, the screen 200 includes the components described herein in conjunction with the screen 701. Fresnel lens assembly 710 includes a Fresnel lens layer 711 formed at the beam entry side of the fluorescent layer of the screen. The Fresnel lens is formed in a dielectric substrate that may be made of, e.g., a glass or a plastic material. A gap 712, or an optical material with a different index of refraction than Fresnel lens layer 711, may be used to create a difference in the refractive index from the Fresnel lens to the next layer of the screen, i.e., RGB assembly 720. Typically, due to the need for the gap 712, the Fresnel lens assembly 710 and the RGB assembly 720 are not held together as a single screen assembly with an adhesive or other material. Other layers may also be formed in Fresnel lens assembly 710, such as an antireflection layer at the entrance surface of the Fresnel lens assembly 710 for receiving the excitation laser light. RGB assembly 720 includes a glass substrate 721, an RGB layer 722 with black pixel-separating matrix 723, an encapsulation layer 724, and a viewer layer 725, which acts as a UV blocking layer. RBG assembly 720 may include other layers as well, such as a dichroitic filter layer on the laser-entry side of RGB assembly 720 and a screen gain layer, designed to optically enhance the brightness of the screen 200. As discussed above, in one embodiment, the film layer 220 is formed so that it has optical properties that will allow it to filter, reflect and/or absorb one or more wavelengths of light, such as blocking UV light in all directions.

Typically, the laser based display system 600 uses high energy UV lasers to deliver the excitation energy to the phosphor regions disposed in the screen 200, 701 to generate a color image. Since human exposure to UV light creates a number of health and safety concerns it is generally important to block its emission through the viewing surface 201 and screen edges 202. Therefore, in one embodiment, an additional material layer 731 is disposed on the screen edge 202 of the screen 200 to prevent unwanted visible and/or UV light leakage. The additional material layer 731 may be formed by modifying a portion of the surface of film layer 220, depositing a coating over a portion of the film layer, or applying an additional film layer over a portion of the film layer 220, to stop unwanted light leakage. In one embodiment, a light absorbing layer is deposited on a portion of the film layer, such as a flap (e.g., reference numeral 222 in FIG. 3A). In one embodiment, the additional material layer 731 is a separate film layer, such as a dark colored adhesive tape that is applied over a surface of the film layer 220. In one embodiment, the dark colored adhesive tape is between about 25 and about 50 microns thick. In one embodiment, it is desirable to position the additional material layer 731 so that it will block visible light passing from the screen regions 202 found at the outside edge of the panel assemblies 250 disposed at the outside edge of a display screen assembly 260. In one embodiment, in configurations where the panel assemblies 250 are rectangular in shape, the additional material layer 731 is thus only be disposed over one or two of the four screen edges 202 of the panel assemblies 250 disposed at the outer edge of the display screen assembly 260.

In one embodiment, the RGB layer 722 includes a plurality of pixels and subpixels. FIG. 7 depicts a single pixel 750 and the red, green, and blue subpixels associated therewith. Each of the subpixels are actually small portions of each of the color phosphor regions, such as a stripe that extends across the screen 200 perpendicular to the scanning path of modulated beam 612, as discussed above. In one embodiment, the width 751 of the pixel 750 is on the order of 1500 microns. For other applications, width 751 may be significantly smaller. In general it is important to assure that the pixel 750 at the edge is disposed as close to the screen edge 202 to reduce the viewer's ability to see the grid pattern 101. Since the thickness of film layer 220 and adhesive layer 230 is substantially smaller than width 751 of pixel 750, gaps between adjacent laser-based display systems 600 are substantially reduced as seen by the viewer when such display systems are joined together to form a tiled display device.

Figure 8:
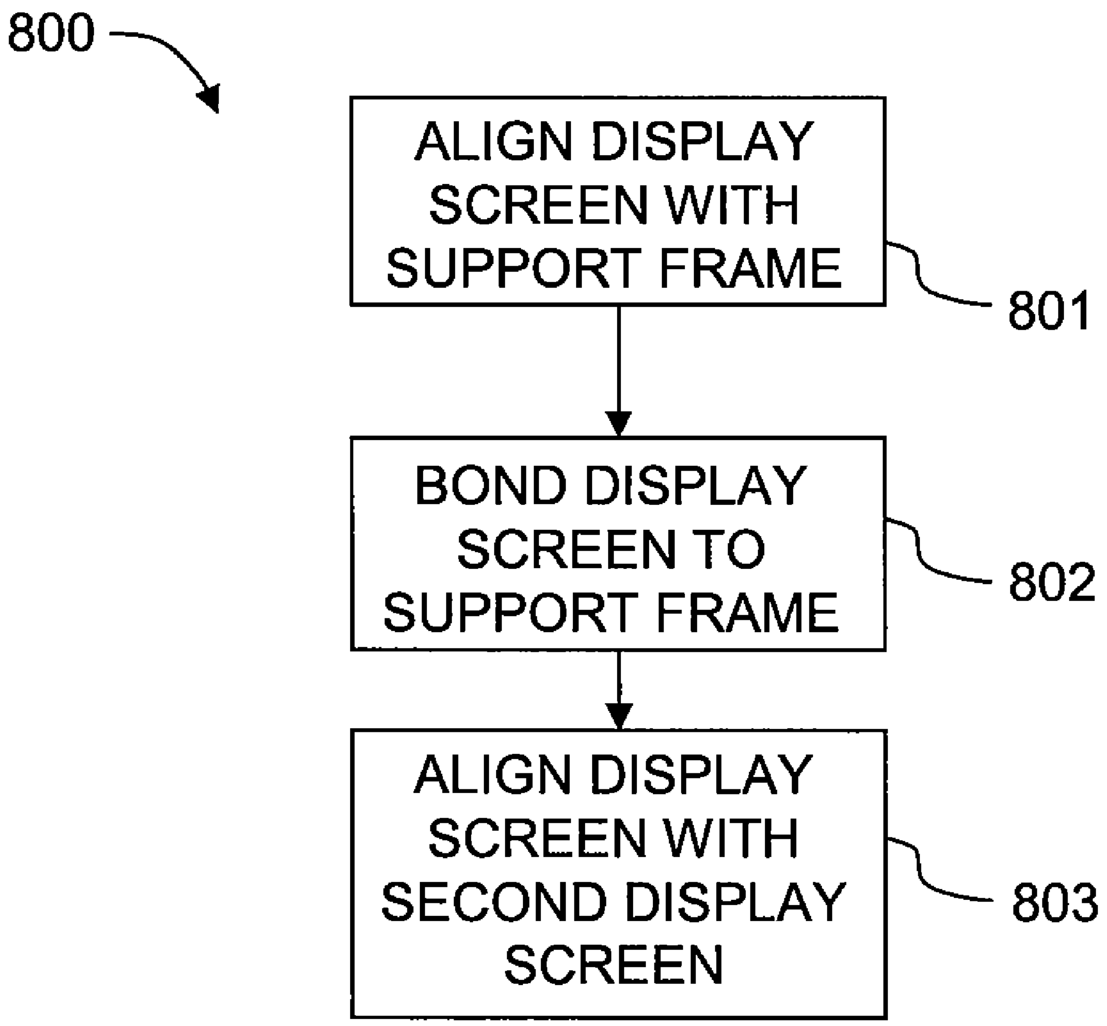
FIG. 8 sets forth a flow diagram of method steps for forming a display screen to display an image, according to an embodiment of the invention.

FIG. 8 illustrates a flow diagram 800 that embodies a processing sequence that is used to form a display assembly to display an image, according to an embodiment of the invention. While the processing sequence steps discussed below describe a formation process using the display screen assembly 260 components discussed in conjunction with FIGS. 2A-2C this configuration is not intended to limiting as to the scope of the invention described herein.

The method begins in step 801, where a screen assembly, e.g., screen 200 in FIG. 2C, is aligned to a support frame, e.g., support frame 210 in FIG. 2C. In one embodiment, a jig or other external device is used to maintain this alignment during steps 801 and 802. In another embodiment, alignment features disposed on the support frame 210 and screen assembly may be used.

In step 802, the screen 200 is bonded to the support frame 210 by disposing a film layer 220, over the viewing surface 201 of the screen 200, and disposing an adhesive layer 230 between the film layer 220 and a surface of the support frame 210. In one embodiment, the adhesive layer 230 is applied directly to the surface of the support frame 210. In another embodiment, the adhesive layer 230 is pre-applied to the portion of the film layer 220 that is placed in contact with the surface of the support frame 210. In another embodiment, the film layer 220 is also disposed over a surface of a screen edge 202 of the screen 200, and the adhesive layer 230 is also applied to the portion of the film layer 220 that will be in contact with the screen edge 202 and/or frame edge 213. In yet another embodiment, the adhesive layer 230 is applied to substantially the entire surface of the film layer 220 that will be in contact with any part of the screen 200 or the support frame 210.

In one embodiment, the film layer 220 is disposed on one or more surfaces of the support frame 210 by folding one or more flaps (e.g., reference numeral 222) downward and against the surfaces of the support frame 210. In one embodiment, the act of folding the film layer 220 downward and bonding the film layer 220 against a surface of the support frame 210 is performed with sufficient tension to form an inner bend radius at the location of the fold line that is substantially equal to the thickness of the film layer 220 and the adhesive layer 230. In one embodiment, the inner bend radius is no greater than about twice the combined thickness of the film layer 220 and/or the adhesive layer 230 and no smaller than about a quarter of the combined thickness of the film layer 220 and the adhesive layer 230. In one embodiment, one or more secondary flaps, e.g., secondary flap 226 in FIG. 3B, are folded onto and bonded to one or more flaps that are already folded onto surface of the support frame 210 and/or edge surfaces of the support frame 210. In one embodiment, it may be desirable to pre-form the film layer 220 so that a desired bend radius is created before it is placed in contact with the screen 200 and support frame 210. The pre-formed film layer may necessarily be slightly thicker than a non-preformed film layer.

In step 803, the screen 200 formed in steps 801 and 802 is aligned with a second, similarly constructed screen 200, and joined thereto by means of the respective support frames 210 of each display screen. Because the thickness of the film layer 220 and adhesive layer 220 is small, the two screens 200 appear to be joined substantially seamlessly to the viewer.

While the foregoing is directed to embodiments of the present invention, other and further embodiments of the invention may be devised without departing from the basic scope thereof, and the scope thereof is determined by the claims that follow.

We claim:

1. A multi-panel display screen for displaying an image, comprising:

a first panel assembly having:

a first support frame having a supporting surface and a frame edge;

a first screen having a viewing surface, an image surface, and a screen edge, wherein the first screen is disposed on the supporting surface of the first support frame; and a first film layer that is substantially transparent to visible light and substantially disposed over the viewing surface, at least a portion of the screen edge, and at least a portion of the frame edge for the purposes of retaining the first screen against the first support frame;

a second panel assembly having:

a second support frame having a supporting surface and a frame edge;

a second screen having a viewing surface, an image surface, and a screen edge, wherein the second screen is disposed on the supporting surface of the second support frame; and a second film layer that is substantially transparent to visible light and disposed over the viewing surface, at least a portion of the screen edge, and at least a portion of the frame edge for the purposes of retaining the second screen against the second support frame, wherein the screen edge of the first panel assembly is positioned adjacent to the screen edge of the second panel assembly, and wherein the first screen is adapted to display a first portion of the image on the viewing surface of the first panel assembly, and the second screen is adapted to display a second portion of the image on the viewing surface of the second panel assembly.

2. The multi-panel display screen of claim 1, further comprising one or more light sources that are positioned to deliver radiation at a first wavelength to the image surface of the first and second screens.

3. The multi-panel display screen of claim 2, wherein the first and second screens further comprises a light-emitting layer that is disposed on the image surface of the first and second screens, and wherein the light-emitting layer comprises light-emitting regions that are each adapted to absorb the radiation delivered by at least one of the plurality of light sources and emit visible light at a second wavelength, different from the first wavelength, to the viewing surface of the first and second screens.

4. The multi-panel display screen of claim 3, further comprising a first material layer that is configured to block the transmission of the radiation delivered at the first wavelength to a portion of the screen edge of the first and second screens.

5. The multi-panel display screen of claim 1, wherein the first film layer substantially covers the screen edge of the first screen, and the second film layer substantially covers the screen edge of the second screen.

6. The multi-panel display screen of claim 1, further comprising:

a plurality of light-emitting regions disposed on the image surface of the first screen, wherein each of the light-emitting regions comprise a phosphor region that has a width, and an adhesive layer disposed between a surface of the first film layer and a surface of the frame edge of the first screen, wherein the combined thickness of the adhesive layer and the first film layer is less than the sum of the widths of at least three adjacent light-emitting regions.

7. The multi-panel display screen of claim 1, wherein the first and second film layers are configured to block the transmission of one or more ultraviolet wavelengths of light passing through a portion of the first and second screens.

8. The multi-panel display screen of claim 1, wherein the first film layer further comprises at least one flap, and wherein an adhesive layer is disposed between a surface of a first flap and a surface of the frame edge of the first screen.

9. The multi-panel display screen of claim 8, wherein the adhesive layer comprises a pressure sensitive adhesive and the first film layer comprises a polyester material.

10. The multi-panel display screen of claim 1, wherein the first film layer further comprises:

a first flap that is disposed over and coupled to a first surface of the frame edge of the first screen; and a second flap that is disposed over and coupled to a second surface of the frame edge of the first screen, wherein a portion of the second flap is disposed over and coupled to a portion of the first surface of the frame edge of the first screen or a portion of the first flap.

11. The multi-panel display screen of claim 1, wherein an adhesive layer is disposed between the first film layer and a surface of the frame edge of the first screen, and the combined thickness of the first film layer and the adhesive layer is less than about 50 microns.

12. The multi-panel display screen of claim 8, wherein the first film layer comprises a viewing region that is disposed over the viewing surface of the first screen and a flap that is disposed over the screen edge and the frame edge of the first screen, and wherein the viewing region and the flap are connected by a connecting region that comprises a bend radius.

13. The multi-panel display screen of claim 12, wherein the connecting region is substantially free of buckles or bubbles.

14. The multi-panel display screen of claim 12, wherein the bend radius is less than about twice the combined thickness of the first film layer and the adhesive layer.

15. The multi-panel display screen of claim 14, wherein the bend radius is greater than about one quarter of the combined thickness of the first film layer and the adhesive layer.

16. The multi-panel display screen of claim 1, wherein the first screen further comprises a first sub-assembly that has a light-emitting layer disposed on a first surface of the first sub-assembly, wherein the light-emitting layer comprises one or more light-emitting regions.

17. A method of forming a display screen that is adapted to display an image, comprising:

aligning a first screen having a first viewing surface, a first image surface and a first screen edge to a first support frame; and disposing a first film layer over at least a portion of the first screen, and coupling at least a portion of the first film layer to a first frame edge of the first support frame for the purposes of retaining the first screen against the first support frame, positioning the first screen edge of the first screen adjacent to a second screen edge of a second screen, wherein the second screen is formed by aligning a second screen having a second viewing surface, a second image surface and the second screen edge to a second support frame; and disposing a second film layer over at least a portion of the second screen, and coupling at least a portion of the second film layer to a second frame edge of the second support frame for the purposes of retaining the second screen against the second support frame, wherein the first film layer and the second film layer are substantially transparent to visible light;

wherein the first screen is adapted to display a first portion of the image on the first viewing surface and the second screen is adapted to display a second portion of the image on the second viewing surface.

18. The method of claim 17, wherein coupling the first film layer further comprises causing an adhesive layer to contact at least a portion of the first film layer and a surface of the first support frame.

19. The method of claim 17, further comprising forming a gap between the first screen edge and the second screen edge that is less than a pixel width of a pixel found on the first image surface of the first screen.

20. The method of claim 19, wherein the pixel width is equal to the sum of the line widths of at least three adjacent light-emitting regions.

21. The method of claim 17, further comprising positioning one or more lasers adjacent to the first image surface, wherein the one or more lasers are adapted to deliver radiation at a first wavelength to a light-emitting layer formed on the first image surface of the first screen, wherein the light-emitting layer comprises a plurality of parallel light-emitting regions that each have a line width and are each adapted to absorb the radiation and emit visible light at a second wavelength, different from the first wavelength, to the first viewing surface.

22. The multi-panel display screen of claim 1, wherein the film layer comprises a polymer.

23. The multi-panel display screen of claim 22, wherein the film layer is selected from the group consisting of polyethylene terephthalate and polyethylene naphthate.

24. The multi-panel display screen of claim 22, wherein the film layer further comprises at least one layer selected from the group consisting of anti-glare film, blocking film, low-reflective film, and combinations thereof.

25. The multi-panel display screen of claim 1, wherein the film layer is placed in tension when disposed over the frame edge.

26. The multi-panel display screen of claim 1, wherein the frame edge is coplanar with the screen edge.

27. The multi-panel display screen of claim 1, wherein the film layer comprises one contiguous sheet disposed on the viewing surface, at least a portion of the screen edge and at least a portion of the frame edge.

28. The multi-panel display screen of claim 1, wherein the film layer has an index of refraction that matches an index of refraction of the screen.

29. The multi-panel display screen of claim 1, wherein a gap formed between the adjacent screen edges is less than the width of a pixel formed in at least one of the panel assemblies.

30. The method of claim 17, wherein the first and second film layers are configured to block the transmission of one or more ultraviolet wavelengths of light passing through a portion of the first and second screens.

31. The method of claim 18, wherein the adhesive layer comprises a pressure sensitive adhesive and the first film layer comprises a polyester material.

32. The method of claim 18, wherein the first film layer comprises a viewing region that is disposed over the viewing surface of the first screen and a flap that is disposed over the screen edge and the frame edge of the first screen, and wherein the viewing region and the flap are connected by a connecting region that comprises a bend radius.

33. The method of claim 32, wherein the bend radius is less than about twice the combined thickness of the first film layer and the adhesive layer.

34. The method of claim 33, wherein the bend radius is greater than about one quarter of the combined thickness of the first film layer and the adhesive layer.

35. The method of claim 17, wherein the first and second film layers each comprises a polymer.

36. The method of claim 35, wherein the first and second film layers are selected from the group consisting of polyethylene terephthalate and polyethylene naphthate.

37. The method of claim 17, wherein the first and second frame edges are coplanar with the respective first and second screen edges.

38. The method of claim 17, wherein the first film layer comprises one contiguous sheet disposed on the first viewing surface, at least a portion of the first screen edge, and at least a portion of the first frame edge.

39. The method of claim 17, wherein the first and second film layers have an index of refraction that matches an index of refraction of the first and second screens.

40. The method of claim 17, wherein the first and second film layers are placed in tension when disposed over the respective first and second frame edges.

41. A method of forming a display screen that is adapted to display an image, comprising:

aligning a first screen having a first viewing surface, a first image surface and a first screen edge to a first support frame; and disposing a first film layer over at least a portion of the first screen, and coupling a first portion of the first film layer over the first viewing surface and a second portion of the first film layer over a surface of a first frame edge of the first support frame for the purposes of retaining the first screen against the first support frame and so that a connecting region formed between the first portion and the second portion are substantially concave in shape, wherein the film layer is substantially transparent to visible light.

* * * * *